(12) United States Patent
Li

(10) Patent No.: US 11,442,562 B2
(45) Date of Patent: Sep. 13, 2022

(54) TOUCHPAD DEVICE

(71) Applicant: Chicony Electronics Co., Ltd., New Taipei (TW)

(72) Inventor: Po-Hsin Li, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 17/408,576

(22) Filed: Aug. 23, 2021

(65) Prior Publication Data

US 2022/0113819 A1 Apr. 14, 2022

(30) Foreign Application Priority Data

Oct. 13, 2020 (TW) .................................. 109135402

(51) Int. Cl.
*G06F 3/041* (2006.01)
*G06F 3/0354* (2013.01)
*G06F 1/16* (2006.01)

(52) U.S. Cl.
CPC .......... *G06F 3/03547* (2013.01); *G06F 1/169* (2013.01)

(58) Field of Classification Search
CPC ....... G06F 1/169; G06F 3/03547; G06F 3/041
See application file for complete search history.

(56) References Cited

U.S. PATENT DOCUMENTS

| | | | | |
|---|---|---|---|---|
| 8,982,062 B2 * | 3/2015 | Bos | ..................... | G06F 3/04883 345/173 |
| 9,069,394 B2 * | 6/2015 | Clayton | .............. | G06F 3/03547 |
| 9,292,051 B2 * | 3/2016 | Takata | ..................... | G06F 1/169 |
| 9,465,416 B2 * | 10/2016 | Shen | ..................... | G06F 1/1692 |
| 9,490,088 B2 * | 11/2016 | Kagayama | ............ | A63F 13/285 |
| 9,542,016 B2 * | 1/2017 | Armstrong-Muntner | ..................... G06F 3/042 | |
| 10,180,739 B2 * | 1/2019 | Kitamura | .............. | G06F 1/1662 |
| 10,725,567 B1 * | 7/2020 | Huang | .................. | G06F 1/1671 |
| 11,287,907 B1 * | 3/2022 | Li | ........................ | G06F 3/03547 |
| 2006/0250377 A1 * | 11/2006 | Zadesky | ............... | G06F 3/0362 345/173 |
| 2013/0207928 A1 * | 8/2013 | Takata | ................ | G06F 3/03547 345/174 |
| 2019/0243475 A1 * | 8/2019 | Huang | .................. | G06F 1/1681 |
| 2019/0384426 A1 * | 12/2019 | Huang | .................... | G06F 1/169 |
| 2021/0263556 A1 * | 8/2021 | Degner | ................... | G06F 1/169 |

FOREIGN PATENT DOCUMENTS

| | | | | |
|---|---|---|---|---|
| CN | 110286806 A | * | 9/2019 | .......... G06F 3/0414 |
| TW | 201935195 A | | 9/2019 | |

* cited by examiner

*Primary Examiner* — Joe H Cheng
(74) *Attorney, Agent, or Firm* — Muncy, Geissler, Olds & Lowe, P.C.

(57) ABSTRACT

A touchpad device includes a substrate, a resilient member, a touch panel, and a linkage assembly. The touch panel is disposed above the top surface of the substrate. The resilient member is disposed between the substrate and the touch panel. The linkage assembly is disposed between the substrate and the touch panel. The linkage assembly includes a first flexible plate, a second flexible plate, and a swing plate. The swing plate includes a first outer side and a first inner side. The first outer side and the first inner side are respectively adjacent to one side of the touch panel and the resilient member. The first flexible plate is connected between the first outer side and the touch panel. The second flexible plate is connected between the first inner side and the resilient member.

21 Claims, 8 Drawing Sheets

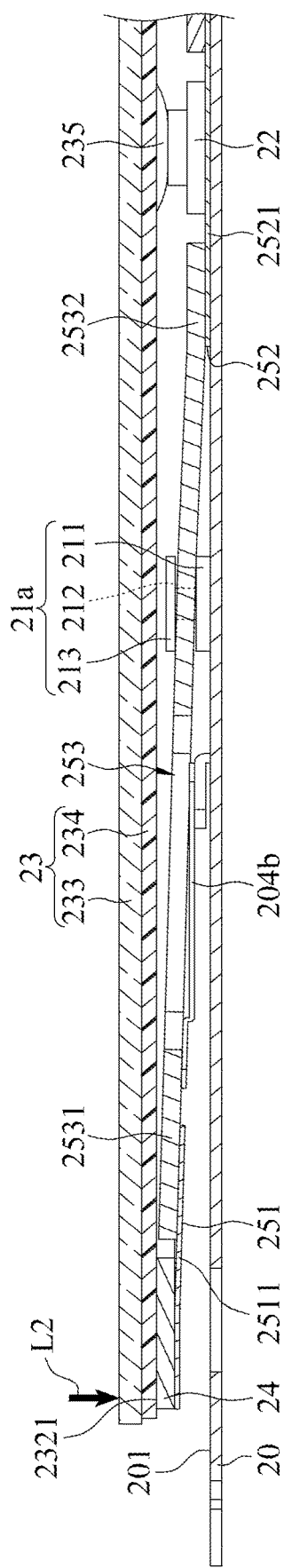
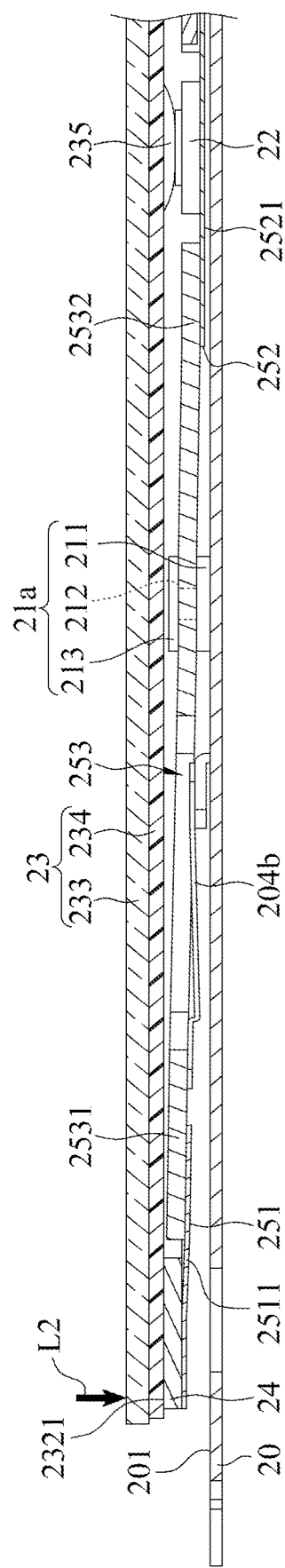
FIG.8
FIG.9

TOUCHPAD DEVICE

CROSS-REFERENCE TO RELATED APPLICATION

This non-provisional application claims priority under 35 U.S.C. § 119(a) to Patent Application No. 109135402 filed in Taiwan, R.O.C. on Oct. 13, 2020, the entire contents of which are hereby incorporated by reference.

BACKGROUND

Technical Field

The instant disclosure relates to an input device, in particular, to a touchpad device.

Related Art

Touchpads are common input devices widely applied in computers. The touchpad is provided for sensing the movement or pressing of a user's finger(s) to control the cursor to perform an action (e.g., to move, to click, or the like).

SUMMARY

A touchpad known to the inventor has a touch panel and a substrate. The touch panel has a pivot side, and the pivot side of the touch panel is pivotally fixed on the substrate. When a portion of the touch panel away from the pivot side is pressed, the touch panel swings downwardly with respect to the substrate by taking the pivot side as the swing axis so as to generate corresponding signal(s).

However, when the user operates the touch panel, he or she would not always accurately press the portion of the touch panel away from the pivot side. Hence, when the user presses the pivot side of the touch panel or presses a region or a corner adjacent to the pivot side, the pressing force of the user cannot allow the touch panel to be moved downwardly smoothly, thus failing to generate corresponding signal(s), and thereby causing inconvenience in operation, influence in operation feelings, and other issues.

In view of this, in one embodiment, a touchpad device is provided. The touchpad device comprises a substrate, a resilient member, a touch panel, and a linkage assembly. The substrate comprises a top surface. The touch panel is disposed above the top surface of the substrate. The resilient member is disposed between the substrate and the touch panel. The resilient member makes the touch panel be kept at a height position. The linkage assembly is disposed between the substrate and the touch panel. The linkage assembly comprises a first flexible plate, a second flexible plate, and a swing plate. The swing plate comprises a first outer side and a first inner side. The first outer side and the first inner side are opposite sides and are respectively adjacent to one side of the touch panel and the resilient member. The first flexible plate is connected between the first outer side and the touch panel, and the second flexible plate is connected between the second inner side and the resilient member.

Based on the above, in the touchpad device according to one or some embodiments of the instant disclosure, the linkage assembly is disposed between the substrate and the touch panel. Therefore, during operation of the touchpad device, when any portion of the touch panel (e.g., any corner or any edge of the touch panel) is pressed, the pressing force would always allow the touch panel and the resilient member to come close to and to abut against and to press each other, thereby generating pressing feelings of the touchpad device for the user.

BRIEF DESCRIPTION OF THE DRAWINGS

The disclosure will become more fully understood from the detailed description given herein below for illustration only, and thus not limitative of the disclosure, wherein:

FIG. 8 illustrates a cross-sectional view along line 8-8 shown in FIG. 6;

FIG. 9 illustrates a schematic operational view of the touchpad device of the second embodiment;

DETAILED DESCRIPTION

Figure 1:
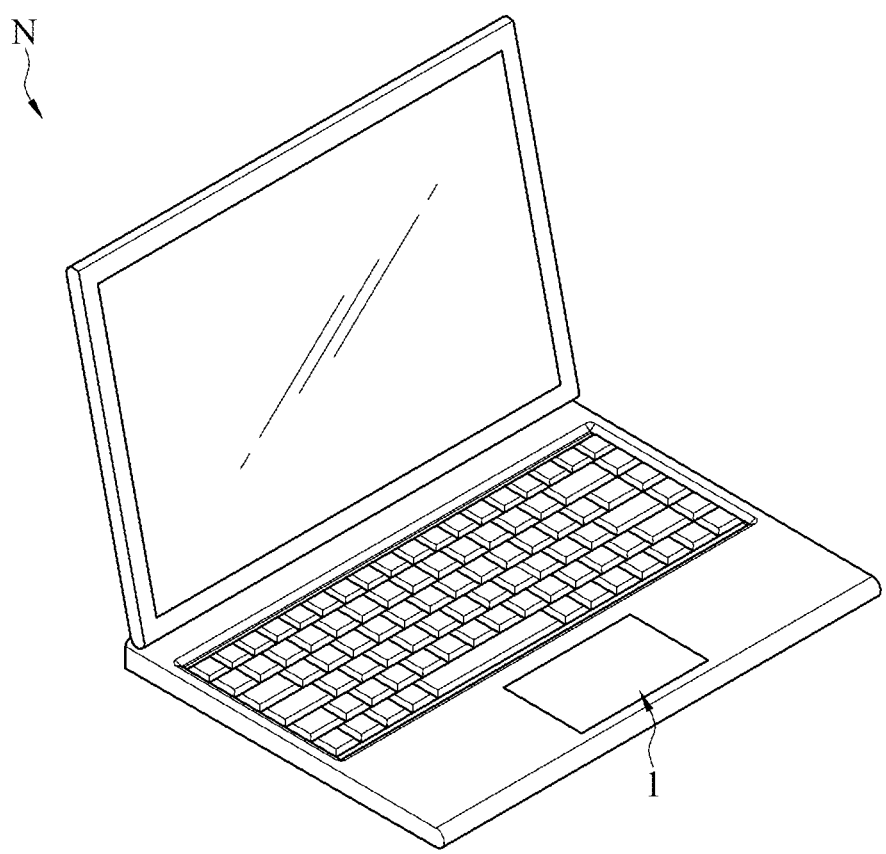
FIG. 1 illustrates a schematic application view of a touchpad device according to an exemplary embodiment of the instant disclosure.

It should be noted that, in the descriptions for the embodiments, the ordinal numbers, e.g., "first", "second", "third", etc., are used to describe different elements, and these elements are not limited due to the use of these ordinal numbers. In the descriptions for the embodiments, the terms "couple" or "connect" are used to indicate that two or more elements are connected to each other physically or electrically in a direct manner, or are used to indicate that two or more elements are connected to each other physically or electrically in an indirect manner. Furthermore, the terms "couple" or "connect" may be used to indicate two or more elements cooperate or interact with each other. Moreover, for sake of convenience and clarity, the thicknesses or the dimensions of the elements in the drawings are presented exaggeratedly, omittedly, or generally, and the person having ordinary skills in the art still can realize and read. The sizes shown in all the drawings in reference with the specification, are not intended to limit the present disclosure, but merely facilitate the understanding and reading for those skilled in the art. Modifications and variations in different scale or sizes can be made without departing from the spirit of the present disclosure. In all the drawings, the same reference numbers are used to indicate the same or similar elements.

Figure 2:
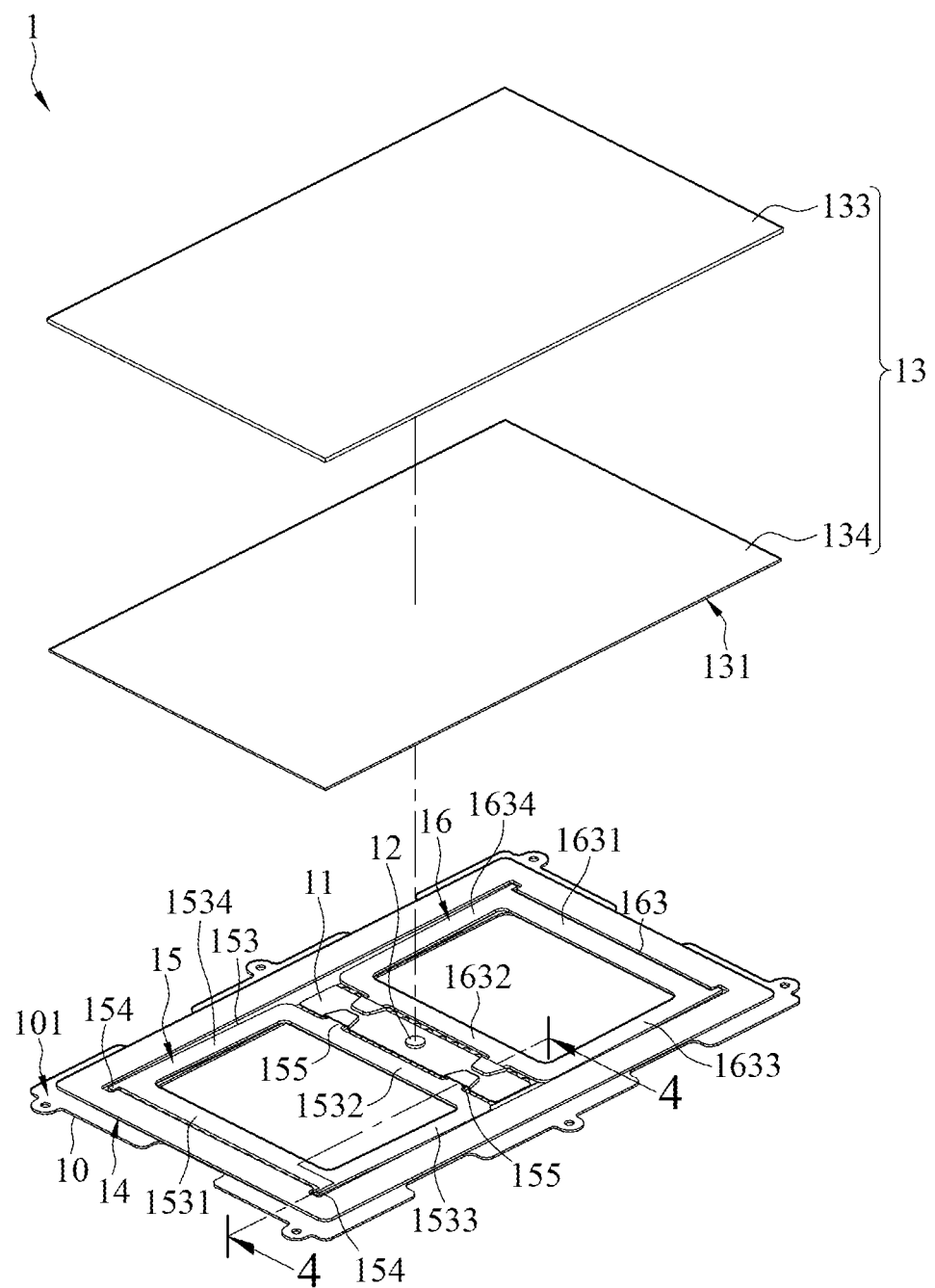
FIG. 2 illustrates an exploded view of a touchpad device according to a first embodiment of the instant disclosure.
Figure 3:
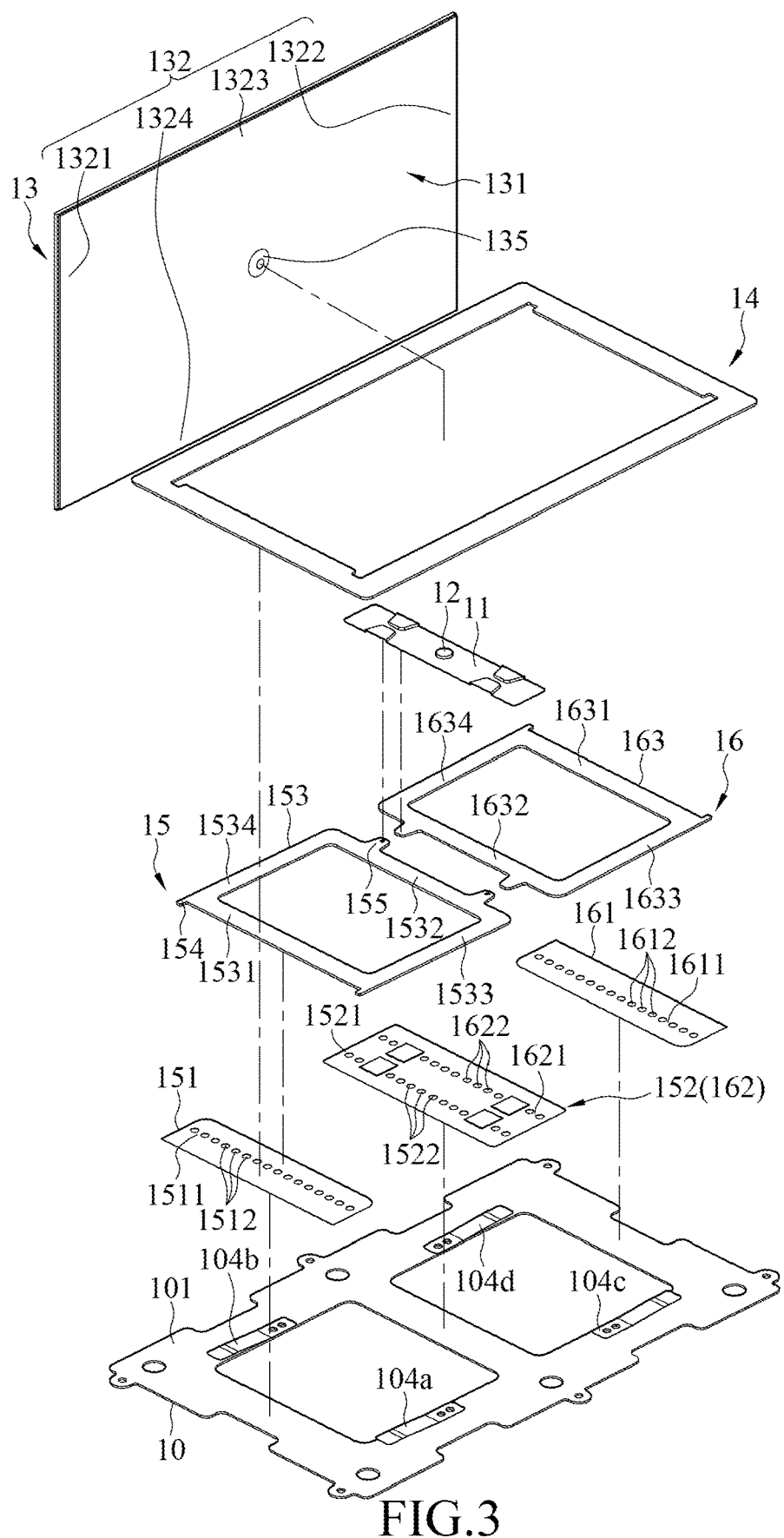
FIG. 3 illustrates another exploded view of the touchpad device of the first embodiment.
Figure 4:
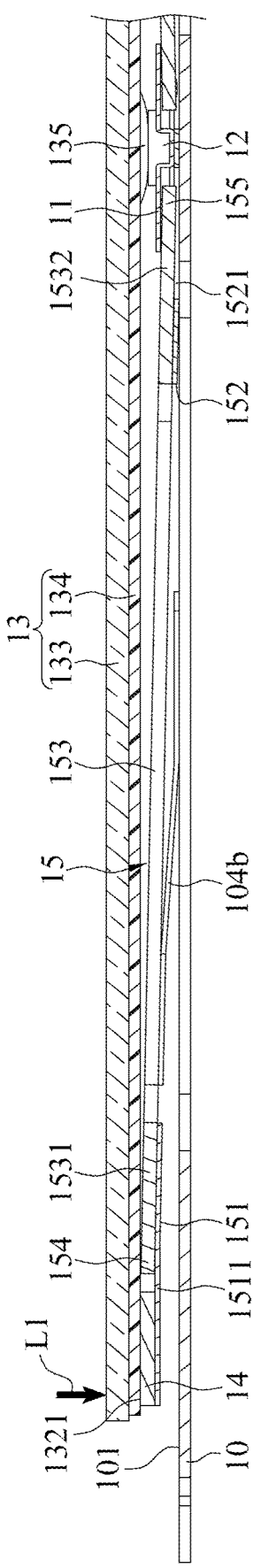
FIG. 4 illustrates a cross-sectional view along line 4-4 shown in FIG. 2.
Figure 5:
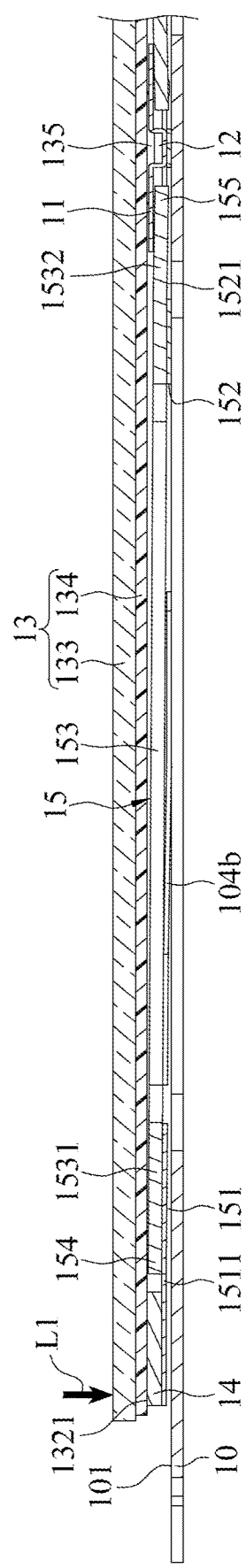
FIG. 5 illustrates a schematic operational view of the touchpad device of the first embodiment.

FIG. 1 illustrates a schematic application view of a touchpad device according to an exemplary embodiment. FIG. 2 illustrates an exploded view of a touchpad device according to a first embodiment of the instant disclosure. FIG. 3 illustrates another exploded view of the touchpad device of the first embodiment. FIG. 4 illustrates a cross-sectional view along line 4-4 shown in FIG. 2. FIG. 5 illustrates a schematic operational view of the touchpad device of the first embodiment. As shown in FIGS. 1 and 2, the touchpad device 1 (e.g., a touchpad or a trackpad) may be applied in a computer product, and the user can operate the touchpad device 1 by sliding or pressing the touchpad device 1 with the user's finger(s) so as to control the movement of the cursor or to generate corresponding control signal(s). For example, as shown in FIG. 1, in this embodiment, the touchpad device 1 is applied in a notebook computer N, but embodiments are not limited thereto. In some embodiments, the touchpad device 1 may be applied in other portable computers (e.g., tablet computers). Alternatively, the touchpad device 1 may be an individual device and may be capable of externally connected to a portable computer, but embodiments are not limited thereto.

As shown in FIGS. 2 and 3, in the first embodiment, the touchpad device 1 comprises a substrate 10, a resilient member 12, a touch panel 13, and a linkage assembly 15. The substrate 10 may be a rigid plate made of metal (e.g., iron, aluminum, alloy, etc.), or plastic material. In this embodiment, the substrate 10 is located at the lowest layer of the touchpad device 1 and has a top surface 101. The resilient member 12, the touch panel 13, and the linkage assembly 15 are all disposed above the top surface 101.

As shown in FIGS. 2 and 3, the resilient member 12 is disposed on the top surface 101 of the substrate 10. In this embodiment, the resilient member 12 is fixed (e.g., by adhering, riveting, locking, or welding) on a middle portion of the top surface 101 of the substrate 10, but embodiments are not limited thereto; the resilient member 12 may be fixed on other positions of the top surface 101 (e.g., on the edge of the top surface 101), according to actual needs for the products. In some embodiments, the resilient member 12 may be a rubber dome, a metal dome, a spring, an elastic piece, a magnetic member, or the like.

As shown in FIGS. 2 and 3, the touch panel 13 is disposed above the top surface 101 of the substrate 10. In this embodiment, the touch panel 13 comprises a touch substrate 133 and a circuit board 134 stacked and fixed with each other, and the circuit board 134 is relatively adjacent to the substrate 10 with respect to the touch substrate 133 (namely, a distance between the circuit board 134 and the substrate 10 is less than a distance between the touch substrate 133 and the substrate 10). The touch substrate 133 is provided for being touched or pressed by the user. The circuit board 134 may perform functions such as scrolling, zooming in, zooming out, opening window, or the like in response to the movement or the gesture of the user's finger(s) on the touch substrate 133. Alternatively, the circuit board 134 may perform functions such as selecting, displaying menu, or the like in response to the click or double click of the user's finger(s) on the touch substrate 133. In some embodiments, the touch substrate 133 may be a plate made of glass or polyester resin (mylar).

As shown in FIGS. 2 to 4, the touch panel 13 comprises a bottom surface 131 and a trigger switch 135. The bottom surface 131 is the surface of the circuit board 134 facing the top surface 101 of the substrate 10. The trigger switch 135 is disposed on the bottom surface 131, and the resilient member 12 is between the substrate 10 and the touch panel 13. In this embodiment, the resilient member 12 is an elastic component and correspondingly abuts against the trigger switch 135, thereby making the touch panel 13 be kept at a height position, but embodiments are not limited thereto. When the touch panel 13 is pressed so as to be moved downwardly with respect to the substrate 10, the trigger switch 135 correspondingly presses the resilient member 12, so that the resilient member 12 stores the elastic force and the trigger switch 135 is triggered to generate signal(s). When the touch panel 13 is released, the touch panel 13 is moved resiliently to the height position with the elastic force stored in the resilient member 12.

As shown in FIGS. 2 to 4, the bottom surface 131 of the touch panel 13 comprises an outer periphery 132. The outer periphery 132 comprises a first side 1321, a second side 1322, a third side 1323, and a fourth side 1324. The first side 1321 and the second side 1322 are opposite sides. The third side 1323 and the fourth side 1324 are opposite sides. The first side 1321 is connected to the third side 1323 and the fourth side 1324, and the second side 1322 is connected to the third side 1323 and the fourth side 1324.

In some embodiments, the touchpad device 1 may comprise at least one set of linkage assembly. The linkage assembly is provided for guiding the touch panel 13 to move upwardly and downwardly with respect to the substrate 10. For example, as shown in FIGS. 2 to 4, in this embodiment, the touchpad device 1 comprises two sets of linkage assemblies (the linkage assembly 15 and the linkage assembly 16). The linkage assembly 15 and the linkage assembly 16 are respectively disposed between the substrate 10 and the touch panel 13, and the resilient member 12 is between the linkage assembly 15 and the linkage assembly 16. The linkage assembly 15 comprises a first flexible plate 151, a second flexible plate 152, and a swing plate 153. In some embodiments, the swing plate 153 may be triangular-shaped, rectangular-shaped, trapezoidal-shaped, apolygonal-shaped, H-shaped, U-shaped, or irregular-shaped. In this embodiment, the swing plate 153 is a polygonal plate and comprises a first outer side 1531, a first inner side 1532, a first side portion 1533, and a second side portion 1534. The first outer side 1531, the first side portion 1533, the first inner side 1532, and the second side portion 1534 are connected with one another. The first outer side 1531 and the first inner side 1532 are opposite sides and respectively adjacent to the first side 1321 of the touch panel 13 and the resilient member 12. The first side portion 1533 and the second side portion 1534 are opposite sides and respectively adjacent to the third side 1323 and the fourth side 1324 of the touch panel 13. That is, three sides of the swing plate 153 (the first outer side 1531, the first side portion 1533, and the second side portion 1534) are adjacent to the outer periphery 132 of the bottom surface 131 of the touch panel 13, and the first inner side 1532 is adjacent to the resilient member 12.

As shown in FIGS. 2 to 4, the first flexible plate 151 of the linkage assembly 15 is connected between the first outer side 1531 of the swing plate 153 and the first side 1321 of the touch panel 13, and the second flexible plate 152 of the linkage assembly 15 is connected between the first inner side 1532 of the swing plate 153 and the resilient member 12. In some embodiments, the second flexible plate 152 is further connected between the first inner side 1532 of the swing plate 153 and the top surface 101 of the substrate 10, and the resilient member 12 is disposed on the top surface 101. The first flexible plate 151 and the second flexible plate 152 may be plates made of flexible materials, for example, the first flexible plate 151 and the second flexible plate 152 may be flexible thin plates made of plastic or metal; while the swing plate 153 may be a rigid plate made of plastic or metal, but embodiments are not limited thereto. In other words, the rigidity of the swing plate 153 is greater than the rigidity of the first flexible plate 151 and greater than the rigidity of the second flexible plate 152. For example, the thickness of the swing plate 153 may be greater than the thickness of the first flexible plate 151 and greater than the thickness of the second flexible plate 152, so that the rigidity of the swing plate 153 is greater than the rigidity of the first flexible plate 151 and greater than the rigidity of the second flexible plate 152. Accordingly, owing to the flexibility of the first flexible plate 151, the first outer side 1531 of the swing plate 153 can be moved with respect to the touch panel 13, and owing to the flexibility of the second flexible plate 152, the first inner side 1532 of the swing plate 153 can be moved with respect to the substrate 10. In some embodiments, the first flexible plate 151, the second flexible plate 152, and the swing plate 153 of the linkage assembly 15 may be integrally formed with each other.

As shown in FIGS. 2 to 4, in this embodiment, the touchpad device 1 further comprises an annular frame 14, and the annular frame 14 may be a rigid plate made of metal or plastic. The annular frame 14 is fixed to the outer periphery 132 of the bottom surface 131 of the touch panel 13. One of two sides of the first flexible plate 151 is fixed to the annular frame 14 (e.g., by adhering, riveting, locking, or welding; further, it is understood that the components according to one or some embodiments can be fixed with each other, but not limited to, by the foregoing ways). Hence, the first flexible plate 151 can be indirectly connected to and fixed to the first side 1321 of the touch panel 13 through the annular frame 14. However, it is understood that, the one of two sides of the first flexible plate 15 may be directly fixed to the first side 1321 of the touch panel 13, embodiments are not limited thereto. The other side of the two sides of the first flexible plate 151 is fixed to the first outer side 1531 of the swing plate 153, the unfixed portion of the first flexible plate 151 between the two sides of the first flexible plate 151 forms a first flexible portion 1511, and the first flexible portion 1511 is capable of being bent and deformed upon suffering a force. One of two sides of the second flexible plate 152 is connected to and fixed to the first inner side 1532 of the swing plate 153, and the other side of the two sides of the second flexible plate 152 is connected to and fixed to the top surface 101 of the substrate 10. The unfixed portion of the second flexible plate 152 between the two sides of the second flexible plate 152 forms a second flexible portion 1521, and the second flexible portion 1521 is capable of being bent and deformed upon suffering a force. In some embodiments, the resilient member 12 is further fixed to the second flexible plate 152, such that the resilient member 12 is indirectly fixed to the top surface 101 of the substrate 10. However, it is understood that, the resilient member 12 may be directly fixed to the top surface 101 of the substrate 10, but embodiments are not limited thereto.

As shown in FIGS. 2 to 4, the another set of the linkage assembly (the linkage assembly 16) and the linkage assembly 15 have similar structures. For example, the linkage assembly 15 and the linkage assembly 16 may be symmetrically configured by taking the resilient member 12 as the symmetry center. In this embodiment, the linkage assembly 16 comprises a third flexible plate 161, a fourth flexible plate 162, and a swing plate 163. The swing plate 163 comprises a second outer side 1631, a second inner side 1632, a third side portion 1633, and a fourth side portion 1634. The second outer side 1631, the third side portion 1633, the second inner side 1632, and the fourth side portion 1634 are connected with one another. The second outer side 1631 and the second inner side 1632 are opposite sides and respectively adjacent to the second side 1322 of the touch panel 13 and the resilient member 12. The third side portion 1633 and the fourth side portion 1634 are opposite sides and respectively adjacent to the third side 1323 and the fourth side 1324 of the touch panel 13. That is, three sides of the swing plate 163 (the second outer side 1631, the third side portion 1633, and the fourth side portion 1634) are adjacent to the outer periphery 132 of the bottom surface 131 of the touch panel 13, and the second inner side 1632 is adjacent to the resilient member 12. In some embodiments, the fourth flexible plate 162 of the linkage assembly 16 and the second flexible plate 152 of the linkage assembly 15 may be integrally formed with each other (as shown in FIG. 3) or may be separated structures.

As shown in FIGS. 2 to 4, the third flexible plate 161 of the linkage assembly 16 is connected between the second outer side 1631 of the swing plate 163 and the second side 1322 of the touch panel 13, and the fourth flexible plate 162 of the linkage assembly 16 is connected between the second inner side 1632 and the resilient member 12. In this embodiment, one of two sides of the third flexible plate 161 is fixed to the annular frame 14. Hence, the third flexible plate 161 can be indirectly connected to and fixed to the second side 1322 of the touch panel 13 through the annular frame 14. However, it is understood that, the one of two sides of the third flexible plate 161 may be directly fixed to the second side 1322 of the touch panel 13, but embodiments are not limited thereto. The other side of the two sides of the third flexible plate 161 is fixed to the second outer side 1631 of the swing plate 163, the unfixed portion of the third flexible plate 161 between the two sides of the third flexible plate 161 forms a third flexible portion 1611, and the third flexible portion 1611 is capable of being bent and deformed upon suffering a force. One of two sides of the fourth flexible plate 162 is connected to the second inner side 1632 of the swing plate 163, and the other side of the two sides of the fourth flexible plate 162 is connected to and fixed to the top surface 101 of the substrate 10. The unfixed portion of the fourth flexible plate 162 between the two sides of the fourth flexible plate 162 forms a fourth flexible portion 1621, and the fourth flexible portion 1621 is capable of being bent and deformed upon suffering a force. In some embodiments, the third flexible plate 161, the fourth flexible plate 162, and the swing plate 163 of the linkage assembly 16 may be integrally formed with each other.

Accordingly, as shown in FIGS. 2 and 3, at least one side of the swing plate 153 of the linkage assembly 15 and the at least one side of the swing plate 163 of the linkage assembly 16 are adjacent to the outer periphery 132 of the touch panel 13, and the swing plate 153 of the linkage assembly 15 and the swing plate 163 of the linkage assembly 16 are connected to the touch panel 13. Hence, when any portion of the touch panel 13 (e.g., any corner or any edge of the touch panel 13) is pressed, the pressing force would always allow the trigger switch 135 on the touch panel 13 and the resilient member 12 to come close to and to press each other via the linkage assembly 15 and the linkage assembly 16, thereby generating corresponding signal(s) and pressing feelings of the touchpad device 1 for the user. As shown in FIGS. 4 and 5, in this embodiment, when a corner portion, an edge portion, or a region of the touch panel 13 adjacent to the linkage assembly 15 is pressed (as indicated by the arrow L1), the touch panel 13 is driven to move downwardly by the linkage assembly 15 to come close to the top surface 101 of the substrate 10. Specifically, in this embodiment, the pressing force may be transmitted to the second flexible plate 152 through the linkage of the first flexible plate 151 and the swing plate 153. Since the second flexible plate 152 is fixed to the substrate 10 so as to form a fulcrum, owing to the flexibility of the first flexible plate 151 and the second flexible plate 152, the swing plate 153 can swing with respect to the substrate 10 by taking the fulcrum as the swing center. Hence, the touch panel 13 is driven to move downwardly and to come close to the top surface 101 of the substrate 10, so that the trigger switch 135 on the touch panel 13 downwardly abuts against and presses the resilient member 12 to allow the resilient member 12 stores elastic force or resilient force, thereby generating the pressing feelings of the touchpad device 1 for the user. Meanwhile, the trigger switch 135 is trigged by the resilient member 12 so as to generate corresponding signal(s). Similarly, when a corner portion, an edge portion, or a region of the touch panel 13 adjacent to the linkage assembly 16 is pressed, the pressing force drives the linkage assembly 16 to swing, and the linkage assembly 16 drives the touch panel 13 to move downwardly and to come close to the top surface 101 of the substrate 10, so that the trigger switch 135 on the touch panel 13 downwardly abuts against and presses the resilient member 12 to allow the resilient member 12 stores elastic force or resilient force, thereby generating the pressing feelings of the touchpad device 1 for the user and corresponding signal(s); repeated descriptions are omitted herein.

Further, as shown in FIGS. 4 and 5, when a region of the touch panel 13 adjacent to the trigger switch 135 is pressed, the pressing force can directly drive the touch panel 13 to move downwardly and to come close to the top surface 101 of the substrate 10, so that the trigger switch 135 on the substrate 10 presses the resilient member 12 downwardly, and the swing plate 153 of the linkage assembly 15 and the swing plate 163 of the linkage assembly 16 are forced to be swung. From the foregoing descriptions, when any portion of the touch panel 13 is pressed, the touch panel 13 can be moved downwardly in a smooth manner so as to generate pressing feelings of the touchpad device 1 for the user and corresponding signal(s). Hence, the operation feelings and the operation convenience of the touchpad device 1 can be improved.

In some embodiments, depending on the product size, the touchpad device 1 may just comprise one set of linkage assembly (the linkage assembly 15). For example, the resilient member 12 may be fixed to the top surface 101 of the substrate 10 and adjacent to one of the sides of the touch panel 13 (e.g., the second side 1322). The first outer side 1531, the first side portion 1533, and the second side portion 1534 of the linkage assembly 15 are respectively adjacent to the first side 1321, the third side 1323, and the fourth side 1324 of the bottom surface 131 of the touch panel 13, while the first inner side 1532 of the linkage assembly 15 is adjacent to the resilient member 12. Accordingly, when a corner, an edge, or a region of the touch panel 13 adjacent to the linkage assembly 15 is pressed, the touch panel 13 is driven to move downwardly by the linkage assembly 15, so that the trigger switch 135 on the touch panel 13 and the resilient member 12 come close to and press each other, thereby triggering the trigger switch 135 to generate signal(s). When a portion of the touch panel 13 adjacent to the resilient member 12 and the second side 1322 is pressed, the pressing force directly drives the touch panel 13 to move downwardly, so that the trigger switch 135 on the touch panel 13 and the resilient member 12 come close to and press each other, thereby triggering the trigger switch 135 to generate signal(s). Accordingly, in the embodiment that the touchpad device 1 comprises one linkage assembly 15, when any portion of the touch panel 13 is pressed, the pressing force allows the touch panel 13 to move downwardly so as to generate the pressing feelings of the touchpad device 1 for the user and the corresponding signal(s).

Furthermore, as shown in FIGS. 2 and 3, according to one or some embodiments of the instant disclosure, the annular frame 14 is fixed to the outer periphery 132 of the bottom surface 131 of the touch panel 13. Accordingly, the structural strength of the entire touch panel 13 can be enhanced. Furthermore, when one of the sides of the outer periphery 132 of the touch panel 13 is pressed, the pressing force may be transmitted to the other sides of the outer periphery 132 through the annular frame 14 much quickly, thereby driving the operations of the linkage assembly 15 and the linkage assembly 16 so as to improve the operation exactness of the touchpad device 1.

Further, as shown in FIGS. 2 and 3, in some embodiments, the first flexible plate 151 and the second flexible plate 152 may be elongated plates, but embodiments are not limited thereto. Moreover, two ends of the first flexible plate 151 respectively extend to the third side 1323 and the fourth side 1324 of the touch panel 13, and two ends of the second flexible plate 152 respectively extend to the third side 1323 and the fourth side 1324 of the touch panel 13. Hence, when the third side 1323 or the fourth side 1324 of the touch panel 13 is pressed, a better driving performance for the touch panel 13 can be provided. In some embodiments, the first flexible plate 151 and the second flexible plate 152 may be triangular-shaped, rectangular-shaped, trapezoidal-shaped, polygonal-shaped, H-shaped, U-shaped, or irregular-shaped.

In some embodiments, at least one elastic member is further provided on the top surface 101 of the substrate 10. As shown in FIGS. 2 and 3, in this embodiment, four elastic members 104a, 104b, 104c, 104d are provided on the top surface 101. Two of the elastic members 104a, 104b abut against the swing plate 153 of the linkage assembly 15, and the other two elastic members 104c, 104d abut against the swing plate 163 of the linkage assembly 16. Since the elastic members 104a, 104b and the elastic members 104c, 104d respectively abut against the swing plate 153 and the swing plate 163, the touch panel 13 can be kept at the height position. Moreover, when the touch panel 13 is pressed so as to be moved downwardly to come close to the substrate 10, the swing plate 153 and the swing plate 163 respectively press the elastic members 104a, 104b and the elastic members 104c, 104d, so that the elastic members 104a, 104b and the elastic members 104c, 104d store elastic forces. When the touch panel 13 is released, the touch panel 13 can be moved upwardly to come back to the height position much more quickly with the help of the elastic forces stored in the four elastic members 104a, 104b, 104c, 104d. Furthermore, the upward and downward movements of the touch panel 13 can be performed more smoothly and stably with the arrangement of the four elastic members 104a, 104b, 104c, 104d. As shown in FIG. 4, when the touch panel 13 is not pressed, the elastic member 104b abuts against the swing plate 153, so that the touch panel 13 is kept at the height position. When a corner portion, an edge portion, or a region of the touch panel 13 adjacent to the linkage assembly 15 is pressed (as indicated by the arrow L1), the touch panel 13 is moved downwardly and comes close to the substrate 10, so that the touch panel 13 drives the swing plate 153 to press the elastic member 104b to allow the elastic member 104b to store elastic force (as shown in FIG. 5). When the touch panel 13 is released, with the help of the elastic force stored in the elastic member 104b, the elastic member 104b abuts against the swing plate 153 to push the swing plate 153 upwardly, thereby driving the touch panel 13 to move upwardly to come back to the height position (as shown in FIG. 4). In some embodiments, the foregoing elastic members 104a, 104b, 104c, 104d may be rubber domes, metal domes, springs, elastic pieces, mechanical switches, or the like. For example, in the embodiment shown in FIGS. 2 and 3, the elastic members 104*a*, 104*b*, 104*c*, 104*d* are elastic pieces and are assembled to and fixed to the top surface 101 of the substrate 10.

As shown in FIGS. 2 and 3, in some embodiments, the first flexible portion 1511 of the first flexible plate 151 of the linkage assembly 15 further comprises a first stress reduction structure 1512. In this embodiment, the first stress reduction structure 1512 comprises a plurality of through holes aligned in a line. Similarly, the second flexible portion 1521 of the second flexible plate 152 of the linkage assembly 15 further comprises a second stress reduction structure 1522. In this embodiment, the second stress reduction structure 1522 comprises a plurality of through holes aligned in a line. Moreover, the third flexible portion 1611 of the third flexible plate 161 of the linkage assembly 16 further comprises a third stress reduction structure 1612. In this embodiment, the third stress reduction structure 1612 comprises a plurality of through holes aligned in a line. Similarly, the fourth flexible portion 1621 of the fourth flexible plate 162 of the linkage assembly 16 further comprises a fourth stress reduction structure 1622. In this embodiment, the fourth stress reduction structure 1622 comprises a plurality of through holes aligned in a line. Accordingly, when the linkage assembly 15 and the linkage assembly 16 are forced, owing to the stress reduction structures 1512, 1522, 1612, 1622, concentration of stresses on the flexible portions 1511, 1521, 1611, 1621 can be reduced during the elastic bending and deformation of the flexible portions 1511, 1521, 1611, 1621, thereby preventing the touch panel 13 from suffering a successive resistance to affect the operation feeling of the touchpad device 1 during the operation of the touch panel 13.

However, it is understood that, the first stress reduction structure 1512, the second stress reduction structure 1522, the third stress reduction structure 1612, and the fourth stress reduction structure 1622 are not limited to the through hole structure; the first reduction structure 1512, the second stress reduction structure 1522, the third stress reduction structure 1612, and the fourth stress reduction structure 1622 may be slots, slits, or lines so as to provide the performance of reducing the concentration of stresses.

As shown in FIGS. 2 to 5, in some embodiments, at least one outer limiting plate 154 further protrudes from the first outer side 1531 of the swing plate 153 of the linkage assembly 15. In this embodiment, two outer limiting plates 154 protrude from the first outer side 1531 and are adjacent to two ends of the first outer side 1531, and the two outer limiting plates 154 abut against the bottom surface 131 of the touch panel 13. Similarly, at least one inner limiting plate 155 further protrudes from the first inner side 1532 of the swing plate 153 of the linkage assembly 15. In this embodiment, two inner limiting plates 155 protrude from the first inner side 1532 and are adjacent to two ends of the first inner side 1532, and the two inner limiting plates 155 abut against the top surface 101 of the substrate 10. Accordingly, when the touch panel 13 is at the height position, the stability of the touch panel 13 can be improved due to the abutting and limiting of the outer limiting plate 154 and the inner limiting plate 155, thereby preventing the touch panel 13 from having deflection and wobbling.

As shown in FIGS. 2 to 5, in some embodiments, the top surface 101 of the substrate 10 further comprises a baffling plate 11, and the inner limiting plate 155 is between the baffling plate 11 and the top surface 101 of the substrate 10. Accordingly, during the swing motion of the swing plate 153 of the linkage assembly 15, the inner limiting plate 155 can be limited between the baffling plate 11 and the top surface 101 of the substrate 10, thereby preventing the swing motion of the swing plate 153 from exceeding the predetermined swing amplitude of the swing plate 153 and thereby improving the stability of the swing motion of the swing plate 153. Accordingly, the stability of the upward/downward movements of the touch panel 13 can be further improved. Moreover, in some embodiments, the resilient member 12 may be further disposed on the baffling plate 11.

Figure 6:
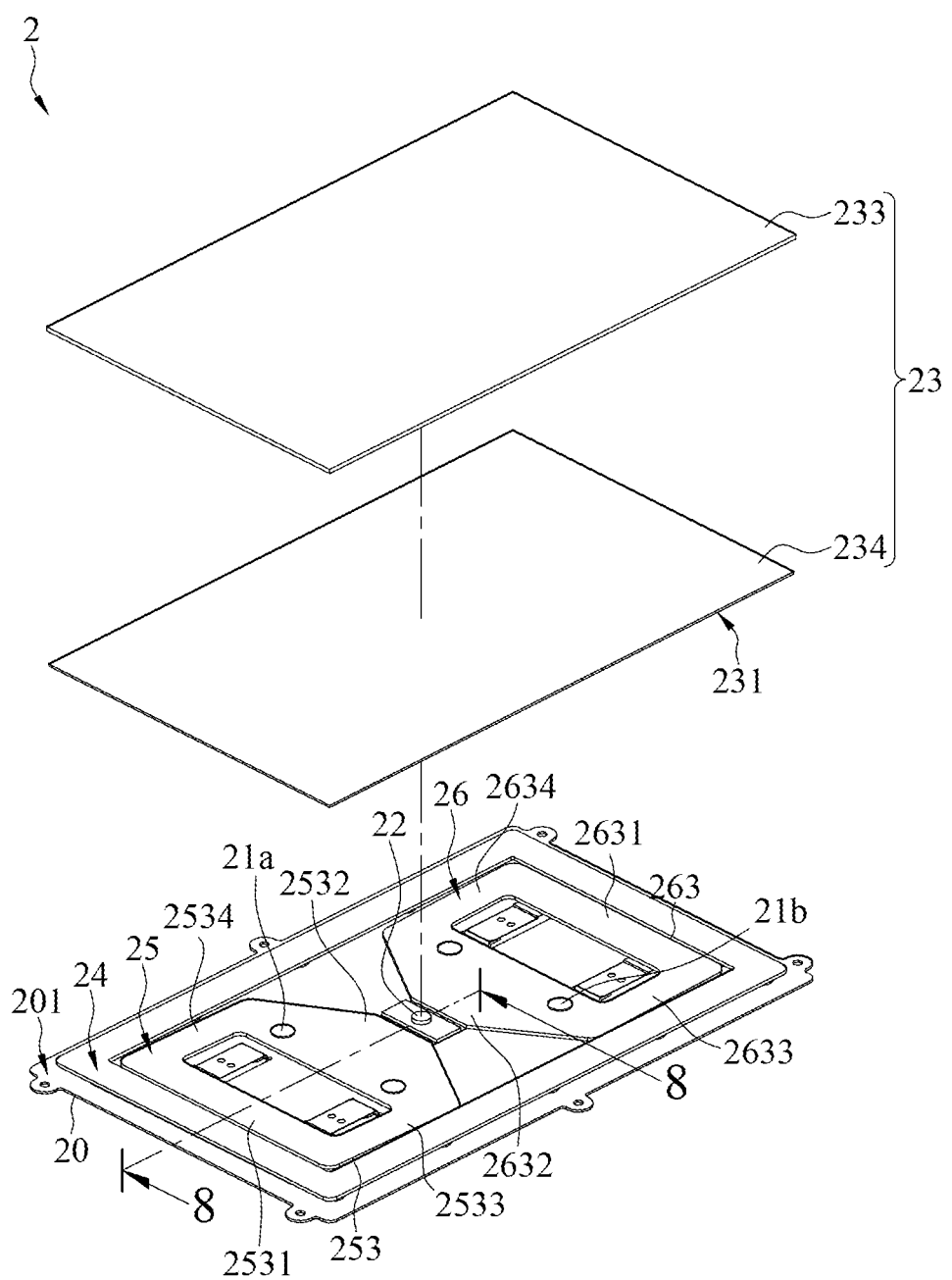
FIG. 6 illustrates an exploded view of a touchpad device according to a second embodiment of the instant disclosure.
Figure 7:
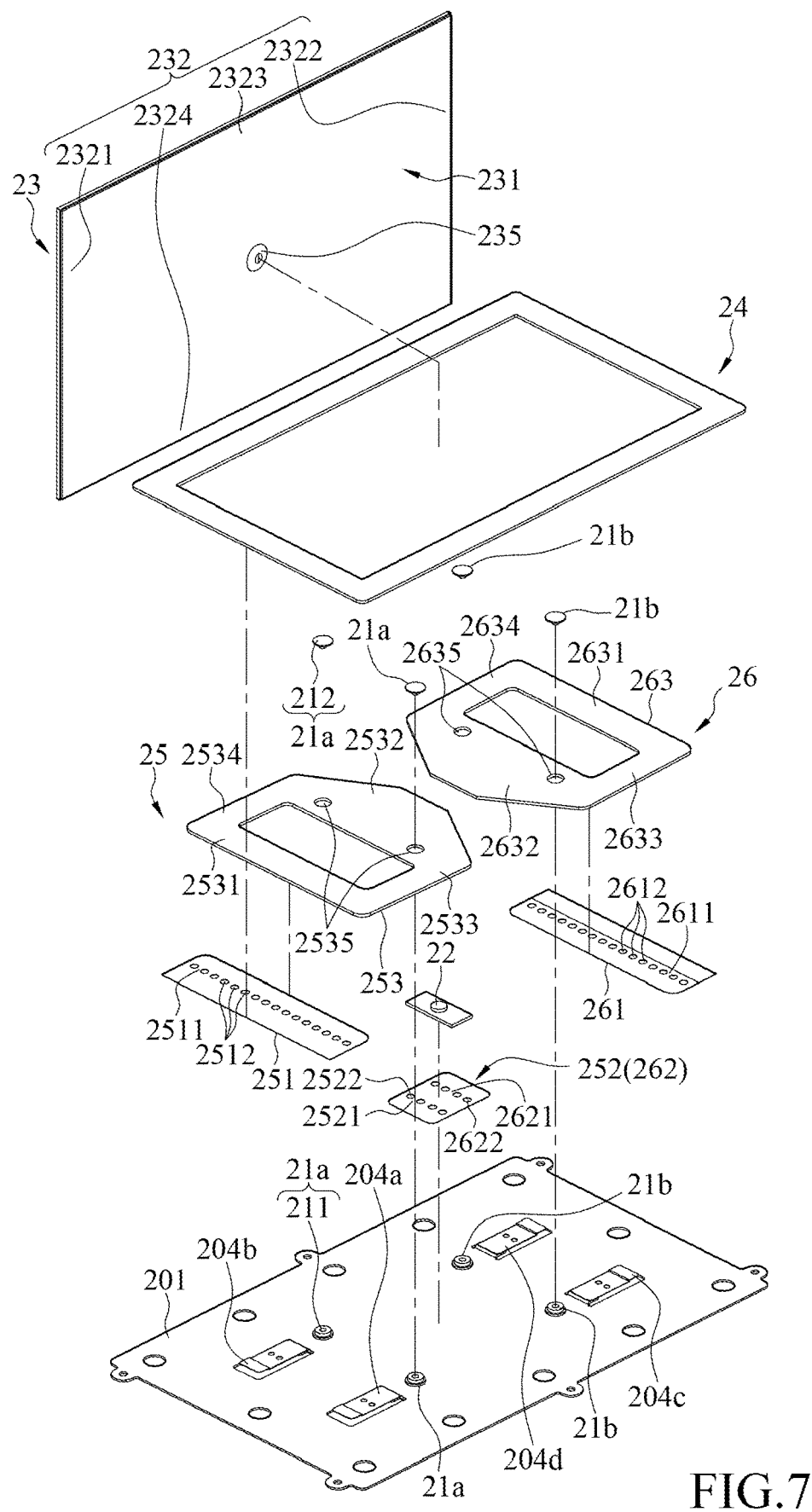
FIG. 7 illustrates another exploded view of the touchpad device of the second embodiment.

FIG. 6 illustrates an exploded view of a touchpad device 2 according to a second embodiment of the instant disclosure. FIG. 7 illustrates another exploded view of the touchpad device 2 of the second embodiment. FIG. 8 illustrates a cross-sectional view along line 8-8 shown in FIG. 6. FIG. 9 illustrates a schematic operational view of the touchpad device 2 of the second embodiment. As shown in FIGS. 6 to 8, in the second embodiment of the instant disclosure, the touchpad device 2 comprises a substrate 20, a resilient member 22, a touch panel 23, and two linkage assemblies 25, 26.

The same or similar features between the first embodiment and the second embodiment are described in the following paragraphs.

As shown in FIGS. 6 to 8, the substrate 20 comprises a top surface 201, and the resilient member 22 is disposed on the top surface 201 of the substrate 20. In this embodiment, the resilient member 22 is on a center portion of the top surface 201, but embodiments are not limited thereto. The touch panel 23 is disposed above the top surface 201 of the substrate 20. The touch panel 23 comprises a bottom surface 231 and a trigger switch 235. The touch panel 23 comprises a touch substrate 233 and a circuit board 234 stacked and fixed with each other. The bottom surface 231 is the surface of the circuit board 234 facing the substrate 20. The trigger switch 235 is disposed on the bottom surface 231. In this embodiment, the resilient member 22 is an elastic component and correspondingly abuts against the trigger switch 235, thereby making the touch panel 23 be kept at a height position, but embodiments are not limited thereto. The bottom surface 231 comprises an outer periphery 232. The outer periphery 232 comprises a first side 2321, a second side 2322, a third side 2323, and a fourth side 2324. The first side 2321, the third side 2323, the second side 2322, and the fourth side 2324 are connected with one another. The first side 2321 and the second side 2322 are opposite sides. The third side 2323 and the fourth side 2324 are opposite sides.

As shown in FIGS. 6 to 8, the linkage assembly 25 is disposed between the substrate 20 and the touch panel 23. The linkage assembly 25 is provided for guiding the touch panel 23 to move upwardly/downwardly with respect to the substrate 20. The linkage assembly 25 comprises a first flexible plate 251, a second flexible plate 252, and a swing plate 253. In some embodiments, the swing plate 253 may be triangular-shaped, rectangular-shaped, trapezoidal-shaped, polygonal-shaped, H-shaped, U-shaped, or irregular-shaped. In this embodiment, the swing plate 253 is a polygonal plate and comprises a first outer side 2531, a first inner side 2532, a first side portion 2533, and a second side portion 2534. The first outer side 2531, the first side portion 2533, the first inner side 2532, and the second side portion 2534 are connected with one another. The first outer side 2531 and the first inner side 2532 are opposite sides and respectively adjacent to the first side 2321 of the touch panel 23 and the resilient member 22. The first side portion 2533 and the second side portion 2534 are opposite sides and respectively adjacent to the third side 2323 and the fourth side 2324 of the touch panel 23. The first flexible plate 251 is connected between the first outer side 2531 and the first side 2321. The unfixed portion of the first flexible plate 251 between two sides of the first flexible plate 251 forms a first flexible portion 2511, and the first flexible portion 2511 is capable of being bent and deformed upon suffering a force. The second flexible plate 252 is connected between the first inner side 2532 and the resilient member 22. The unfixed portion of the second flexible plate 252 between two sides of the second flexible plate 252 forms a second flexible portion 2521, and the second flexible portion 2521 is capable of being bent and deformed upon suffering a force. In some embodiment, the first flexible plate 251, the second flexible plate 252, and the swing plate 253 of the linkage assembly 25 may be integrally formed with each other.

As shown in FIGS. 6 to 8, the touchpad device 2 further comprises an annular frame 24. The annular frame 24 is fixed to the outer periphery 232 of the bottom surface 231 of the touch panel 23. One of two sides of the first flexible plate 251 is fixed to the annular frame 24. Hence, the first flexible plate 251 can be indirectly connected to and fixed to the first side 2321 of the touch panel 23.

As shown in FIGS. 6 to 8, the touchpad device 2 may further comprise another linkage assembly (the linkage assembly 26). For example, the linkage assembly 25 and the linkage assembly 26 may be symmetrically configured by taking the resilient member 22 as the symmetry center. In this embodiment, the linkage assembly 25 and the linkage assembly 26 have similar structures. The linkage assembly 26 comprises a third flexible plate 261, a fourth flexible plate 262, and swing plate 263. The swing plate 263 comprises a second outer side 2631, a second inner side 2632, a third side portion 2633, and a fourth side portion 2634. The second outer side 2631, the third side portion 2633, the second inner side 2632, and the fourth side portion 2634 are connected with one another. The second outer side 2631 and the second inner side 2632 are opposite sides and respectively adjacent to the second side 2322 of the touch panel 23 and the resilient member 22. The third side portion 2633 and the fourth side portion 2634 are opposite sides and respectively adjacent to the third side 2323 and the fourth side 2324 of the touch panel 23. The third flexible plate 261 is connected between the second outer side 2631 and the second side 2322. The unfixed portion of the third flexible plate 261 between two sides of the third flexible plate 261 forms a third flexible portion 2611, and the third flexible portion 2611 is capable of being bent and deformed upon suffering a force. In some embodiments, one of two sides of the third flexible plate 261 is fixed to the annular frame 24. Hence, the third flexible plate 261 can be indirectly connected to and fixed to the second side 2322 of the touch panel 23 through the annular frame 24. However, it is understood that, the one of two sides of the third flexible plate 261 may be directly fixed to the second side 2322 of the touch panel 23, but embodiments are not limited thereto. The fourth flexible plate 262 is connected between the second inner side 2632 and the resilient member 22. The unfixed portion of the fourth flexible plate 262 between two sides of the fourth flexible plate 262 forms a fourth flexible portion 2621, and the fourth flexible portion 2621 is capable of being bent and deformed upon suffering a force. In some embodiments, the third flexible plate 261, the fourth flexible plate 262, and the swing plate 263 of the linkage assembly 26 may be integrally formed with each other.

In some embodiments, at least one elastic member is further provided on the top surface 201 of the substrate 20. As shown in FIGS. 6 to 8, in this embodiment, four elastic members 204a, 204b, 204c, 204d are provided on the top surface 201. Two of the elastic members 204a, 204b abut against the swing plate 253 of the linkage assembly 25, and the rest two elastic members 204c, 204d abut against the swing plate 263 of the linkage assembly 26.

As shown in FIGS. 6 to 8, the first flexible portion 2511 of the first flexible plate 251 of the linkage assembly 25 further comprises a first stress reduction structure 2512, and the second flexible portion 2521 of the second flexible plate 252 of the linkage assembly 25 further comprises a second stress reduction structure 2522. Similarly, the third flexible portion 2611 of the third flexible plate 261 of the linkage assembly 26 further comprises a third stress reduction structure 2612, and the fourth flexible portion 2621 of the fourth flexible plate 262 of the linkage assembly 26 further comprises a fourth stress reduction structure 2622. In some embodiments, the first reduction structure 2512, the second stress reduction structure 2522, the third stress reduction structure 2612, and the fourth stress reduction structure 2622 may be through holes, slots, slits, or lines. Accordingly, when the first flexible portion 2511, the second flexible portion 2521, the third flexible portion 2611, or the fourth flexible portion 2621 is forced to be bent and deformed elastically, concentration of the stresses can be reduced, thereby preventing the touch panel 23 from suffering a successive resistance to affect the operation feeling of the touchpad device 2 during the operation of the touch panel 23.

Different features between the first embodiment and the second embodiment at least are described in the following paragraphs.

As shown in FIGS. 6 to 8, the top surface 201 of the substrate 20 comprises at least one fulcrum base. In this embodiment, the top surface 201 comprises two fulcrum bases 21a and two fulcrum bases 21b. The two fulcrum bases 21a and the two fulcrum bases 21b are respectively at opposite sides of the resilient member 22. The two fulcrum bases 21a are spacedly disposed on the substrate 20, and the two fulcrum bases 21b are spacedly disposed on the substrate 20. The swing plate 253 comprises at least one fixation portion 2535. In this embodiment, the swing plate 253 comprises two fixation portions 2535. The two fixation portions 2535 are between the first outer side 2531 and the first inner side 2532, and the fixation portions 2535 are respectively fixed to the fulcrum bases 21a. The resilient member 22 is connected to and fixed to the second flexible plate 252 of the linkage assembly 25 and is not fixed to the substrate 20, and the second flexible plate 252 of the linkage assembly 25 is not fixed to the substrate 20 as well. The linkage assembly 25 is capable of being swung by taking the fulcrum bases 21a as the swing centers, so that the resilient member 22 moves toward or away from the trigger switch 235 through the second flexible plate 252. The swing plate 263 comprises at least one fixation portion 2635. In this embodiment, the swing plate 263 comprises two fixation portions 2635. The two fixation portions 2635 are between the second outer side 2631 and the second inner side 2632, and the fixation portions 2635 are respectively fixed to the two fulcrum bases 21b. The resilient member 22 is connected to and fixed to the fourth flexible plate 262 of the linkage assembly 26 and is not fixed to the substrate 20, and the fourth flexible plate 262 is not fixed to the substrate 20 as well. The linkage assembly 26 is capable of being swung by taking the fulcrum bases 21b as the swing centers, so that the resilient member 22 moves toward or away from the trigger switch 235 through the fourth flexible plate 262.

Accordingly, as shown in FIGS. 6 to 9, at least one side of the swing plate 253 of the linkage assembly 25 and the at least one side of the swing plate 263 of the linkage assembly 26 are adjacent to the outer periphery 232 of the touch panel 23, and the swing plate 253 of the linkage assembly 25 and the swing plate 263 of the linkage assembly 26 are connected to the touch panel 23. Hence, when any portion of the touch panel 23 (e.g., any corner or any edge of the touch panel 23) is pressed, the pressing force would always allow the touch panel 23 and the resilient member 22 to come close to, to abut against and to press each other through the linkage assembly 25 and the linkage assembly 26, thereby generating pressing feelings of the touchpad device 2 for the user and generating corresponding signal(s). As shown in FIGS. 8 and 9, in this embodiment, when a corner portion, an edge portion, or a region of the touch panel 23 adjacent to the linkage assembly 25 is pressed (as indicated by the arrow L2), the pressing force drives the resilient member 22 to move upwardly and to come close to the touch panel 23 through the linkage assembly 25. Specifically, in this embodiment, the pressing force may be transmitted to the second flexible plate 252 through the linkage of the first flexible plate 251 and the swing plate 253. Hence, owing to the lever principle and the flexibility of the first flexible plate 251 and the second flexible plate 252, the swing plate 253 can swing by taking the fulcrum bases 21a as the swing centers so as to drive the second flexible plate 252 and the resilient member 22 to move upwardly and to come close to the touch panel 23. Moreover, at the same time, the touch panel 23 is pressed to move toward the substrate 20, so that the resilient member 22 upwardly abuts against and presses the trigger switch 235 on the touch panel 23 to allow the resilient member 22 to store elastic force, thereby generating the pressing feelings of the touchpad device 2 for the user, and the trigger switch 235 is triggered by the resilient member 22 so as to generate corresponding signal(s). Similarly, when a corner portion, an edge portion, or a region of the touch panel 23 adjacent to the linkage assembly 26 is pressed, the pressing force drives the linkage assembly 26 to swing by taking the fulcrum bases 21b as the swing centers so as to drive the fourth flexible plate 262 and the resilient member 22 to move upwardly and to come close to the touch panel 23, so that the resilient member 22 upwardly presses the trigger switch 235 on the touch panel 23 to allow the resilient member 22 to store elastic force, thereby generating the pressing feelings of the touchpad device 2 for the user, and the trigger switch 235 is triggered by the resilient member 22 so as to generate corresponding signal(s); repeated descriptions are omitted herein.

Furthermore, since the elastic members 204a, 204b, 204c, 204d respectively abut against the swing plate 253 and the swing plate 263, the touch panel 23 can be kept at the height position. As shown in FIG. 8, when the touch panel 23 is not pressed, the elastic member 204b abuts against the swing plate 253, so that the touch panel 23 is kept at the height position. When a corner portion, an edge portion, or a region of the touch panel 23 adjacent to the linkage assembly 25 is pressed (as indicated by the arrow L2), the touch panel 23 is moved downwardly and comes close to the substrate 20, so that the touch panel 23 drives the swing plate 253 to abut against and press the elastic member 204b to allow the elastic member 204b to store elastic force (as shown in FIG. 9). When the touch panel 23 is released, with the help of the elastic force stored in the elastic member 204b, the elastic member 204b abuts against the swing plate 253 to push the swing plate 235 upwardly, thereby driving the touch panel 23 to move upwardly to come back to the height position (as shown in FIG. 8).

As shown in FIGS. 6 to 9, a shortest distance between the fixation portion 2535 of the swing plate 253 of the linkage assembly 25 and the first outer side 2531 is greater than a shortest distance between the fixation portion 2535 of the swing plate 253 of the linkage assembly 25 and the first inner side 2532. In other words, the force arm between the first outer side 2531 and the fulcrum bases 21a is greater than the force arm between the first inner side 2532 and the fulcrum bases 21a. Therefore, when a portion of the touch panel 23 adjacent to the first outer side 2531 is pressed, the user can perform the pressing with less force. In some embodiments, the linkage assembly 26 may have identical force-saving configurations. That is, a shortest distance between the fixation portion 2635 of the swing plate 263 of the linkage assembly 26 and the second outer side 2631 is greater than a shortest distance between the fixation portion 2635 of the swing plate 263 of the linkage assembly 26 and the second inner side 2632; repeated descriptions are omitted herein.

As shown in FIGS. 6 to 9, in some embodiments, the fixation portions 2535 of the swing plate 253 of the linkage assembly 25 and the fixation portions 2635 of the swing plate 263 of the linkage assembly 26 may be through holes. The fulcrum bases 21a and the fulcrum bases 21b have the same structure. Taking one of the fulcrum bases 21a as an example, the fulcrum base 21a comprises a base 211 and a T-shaped fixing member 212. The base 211 is fixed to the top surface 201 of the substrate 20, and the T-shaped fixing member 212 passes through the corresponding fixation portion 2535 and is assembled with the base 211. The T-shaped fixing member 212 comprises a head portion 213, and a distance between the head portion 213 and the base 211 is greater than a thickness of the swing plate 253, so that the portion of the swing plate 253 of the linkage assembly 25 between the head portion 213 and the base 211 is not fixed. Accordingly, the swing plate 253 can be forced so as to be swung with respect to the fulcrum bases 21a. In some embodiments, the fulcrum bases 21b and the fixation portions 2635 of the linkage assembly 26 may be cooperated by the foregoing manners, and repeated descriptions are thus omitted herein.

Figure 10:
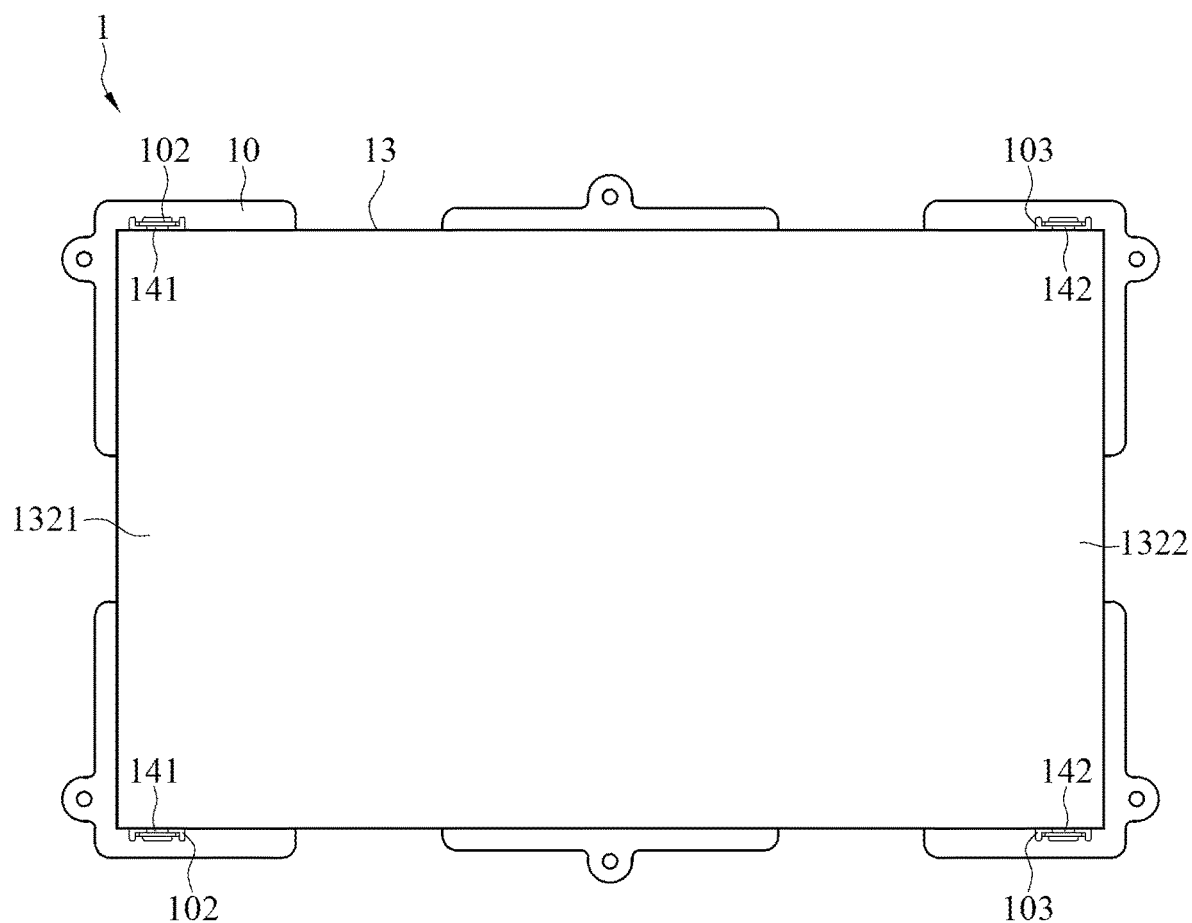
FIG. 10 illustrates a top view of a touchpad device according to a third embodiment of the instant disclosure.
Figure 11:
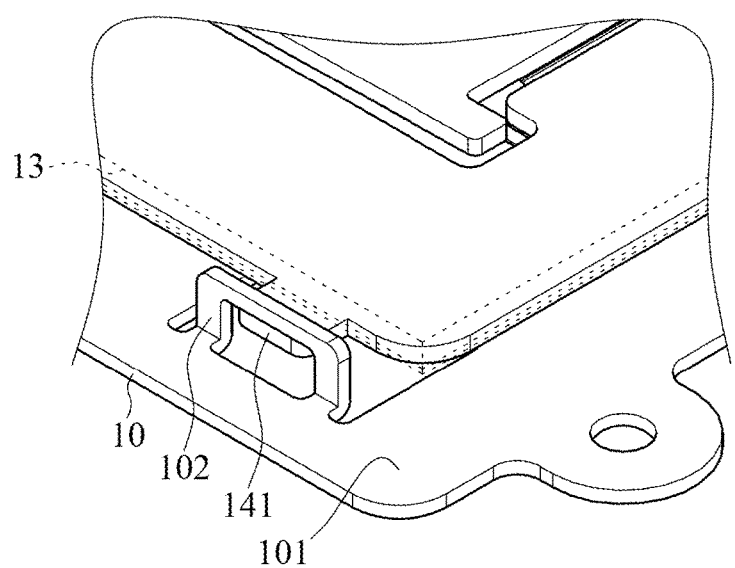
FIG. 11 illustrates an enlarged partial perspective view of the touchpad device of the third embodiment.

In some embodiments, the touchpad device 1 of the first embodiment and the touchpad device 2 of the second embodiment may further comprise stopping structures for limiting the height of the touch panel 13, 23 so as to prevent one side of the touch panel 13, 23 from being lifted upwardly upon the touch panel 13, 23 is forced. As shown in FIGS. 10 and 11, taking the touchpad device 1 of the first embodiment as an example, the top surface 101 of the substrate 10 comprises at least one first stopping member 102 and at least one second stopping member 103. In this embodiment, the number of the first stopping members 102 is two and the two first stopping members 102 are respectively adjacent to two of the corners of the touch panel 13 and the first side 1321. Similarly, in this embodiment, the number of the second stopping members 103 is two and the two second stopping members 103 are respectively adjacent to the rest two corners of the touch panel 13 and the second side 1322. Moreover, at the height position, the touch panel 13 is respectively limited by the two first stopping members 102 and the two second stopping members 103. Accordingly, when any side of the touch panel 13 is pressed, one side of the touch panel 13 is not lifted. For example, when the first side 1321 of the touch panel 13 is pressed downwardly, the second side 1322 is limited by the second stopping member 103, thereby preventing the second side 1322 of the touch panel 13 from being lifted upwardly. Hence, the pressing force applied to the first side 1321 of the touch panel 13 can be quickly transmitted to the second side 1322 of the touch panel 13 so as to drive the entire touch panel 13 to move downwardly, thereby triggering the trigger switch 135. In some embodiments, the first stopping members 102 and the second stopping members 103 may be bent plates integrally extending from the substrate 10.

As shown in FIGS. 10 and 11, in some embodiments, the annular frame 14 fixed to the outer periphery 132 of the bottom surface 131 of the touch panel 13 (please refer to FIG. 3) may comprise at least one first stopping portion 141 and at least one second stopping portion 142. When the touch panel 13 is at the height position, the first stopping portion 141 abuts against the first stopping members 102, and the second stopping portion 142 abuts against the second stopping members 103. For example, as shown in FIG. 11, in this embodiment, the first stopping portion 141 is a protruding rib protruding from a periphery of the annular frame 14, and the first stopping member 102 is a U-shaped bent plate integrally extending from the substrate 10. When the touch panel 13 is at the height position, the first stopping portion 141 can be buckled with the first stopping member 102 correspondingly to provide the limiting function. In some embodiments, the second stopping portion 142 and the first stopping portion 141 may have identical structure or similar structures, and the second stopping member 103 and the first stopping member 102 may have identical structure or similar structures, and repeated descriptions are thus omitted herein.

Based on the above, in the touchpad device according to one or some embodiments of the instant disclosure, through the connection of the swing plate of the linkage assembly to the touch panel and the substrate, during the operation of the touchpad device, when any portion of the touch panel (e.g., any corner or any edge of the touch panel) is pressed, the pressing force would always trigger the trigger switch so as to generate corresponding signal(s). Moreover, with the resilient member and the elastic member(s), the pressing feelings of the touchpad device for the user can be provided.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A touchpad device comprising:
a substrate comprising a top surface;
a touch panel disposed above the top surface of the substrate;
a resilient member disposed between the substrate and the touch panel, wherein the resilient member makes the touch panel be kept at a height position; and
a linkage assembly disposed between the substrate and the touch panel, wherein the linkage assembly comprises a first flexible plate, a second flexible plate, and a swing plate, wherein the swing plate comprises a first outer side and a first inner side, wherein the first outer side and the first inner sider are opposite sides and are respectively adjacent to one side of the touch panel and the resilient member, and wherein the first flexible plate is connected between the first outer side and the touch panel, and the second flexible plate is connected between the first inner side and the resilient member.

2. The touchpad device according to claim 1, wherein the touch panel comprises a bottom surface and a trigger switch, the trigger switch is disposed on the bottom surface, and the resilient member corresponds to the trigger switch.

3. The touchpad device according to claim 1, wherein one of two sides of the second flexible plate is fixed to the first inner side, and the other side of the second flexible plate is fixed to the top surface of the substrate.

4. The touchpad device according to claim 3, wherein the resilient member is fixed on the second flexible plate.

5. The touchpad device according to claim 1, wherein the top surface of the substrate comprises a fulcrum base, the swing plate comprises a fixation portion, the fixation portion is fixed to the fulcrum base, and the linkage assembly is capable of being swung by taking the fulcrum base as a swing center, so that the resilient member moves toward or away from the touch panel.

6. The touchpad device according to claim 5, wherein the fixation portion of the swing plate of the linkage assembly is a through hole, and the fulcrum base comprises a base and a T-shaped fixing member, wherein the base is fixed to the top surface of the substrate, the T-shaped fixing member passes through the through hole and is assembled with the base, and wherein the T-shaped fixing member comprises a head portion, and a distance between the head portion and the base is greater than a thickness of the swing plate.

7. The touchpad device according to claim 5, wherein the fixation portion of the swing plate is located between the first outer side and the first inner side, and a shortest distance between the fixation portion and the first outer side is greater than a shortest distance between the fixation portion and the first inner side.

8. The touchpad device according to claim 5, wherein the resilient member is fixed on the second flexible plate.

9. The touchpad device according to claim 1, wherein the touch panel comprises a bottom surface, the bottom surface comprises an outer periphery, the outer periphery comprises a first side, a second side, a third side, and a fourth side connected with one another, and wherein the first side and the second side are opposite sides, the third side and the fourth side are opposite sides, and the first flexible plate is connected between the first outer side and the first side.

10. The touchpad device according to claim 9, wherein the swing plate comprises a first side portion and a second side portion, wherein the first outer side, the first side portion, the first inner side, and the second side portion are connected with one another, and wherein the first side portion and the second side portion are opposite sides and are respectively adjacent to the third side and the fourth side.

11. The touchpad device according to claim 1, further comprising a second linkage assembly disposed between the substrate and the touch panel, wherein the resilient member is between the linkage assembly and the second linkage assembly, and wherein the second linkage assembly comprises a third flexible plate, a fourth flexible plate, and a second swing plate, the third flexible plate is connected between the second swing plate and the touch panel, and the fourth flexible plate is connected between the second swing plate and the resilient member.

12. The touchpad device according to claim 1, further comprising an annular frame, wherein the annular frame is fixed with a peripheral portion of a bottom surface of the touch panel, and one side of the first flexible plate is fixed to the annular frame so as to be connected to the touch panel.

13. The touchpad device according to claim 1, wherein the first flexible plate, the second flexible plate, and the swing plate are integrally formed with each other.

14. The touchpad device according to claim 1, wherein the touch panel comprises a bottom surface, an outer limiting plate protrudes from the first outer side of the swing plate, and the outer limiting plate abuts against the bottom surface of the touch panel.

15. The touchpad device according to claim 1, wherein an inner limiting plate protrudes from the first inner side of the swing plate, and the inner limiting plate abuts against the top surface of the substrate.

16. The touchpad device according to claim 15, wherein the top surface of the substrate further comprises a baffling plate, and the inner limiting plate is between the baffling plate and the top surface of the substrate.

17. The touchpad device according to claim 1, wherein the first flexible plate comprises a first flexible portion, and the first flexible portion comprises a first stress reduction structure.

18. The touchpad device according to claim 1, wherein the second flexible plate comprises a second flexible portion, and the second flexible portion comprises a second stress reduction structure.

19. The touchpad device according to claim 1, wherein the top surface of the substrate comprises a first stopping member and a second stopping member, the first stopping member and the second stopping member are respectively adjacent to two opposite sides of the touch panel, and at the height position, the touch panel is respectively limited by the first stopping member and the second stopping member.

20. The touchpad device according to claim 19, further comprising an annular frame, wherein the annular frame is fixed with a peripheral portion of a bottom surface of the touch panel, the annular frame comprises a first stopping portion and a second stopping portion, and wherein when the touch panel is at the height position, the first stopping portion abuts against the first stopping member, and the second stopping portion abuts against the second stopping member.

21. The touchpad device according to claim 1, wherein an elastic member is further provided on the top surface of the substrate, and the elastic member elastically abuts against the swing plate.

* * * * *